(12) United States Patent
Hammond et al.

(10) Patent No.: US 6,820,067 B1
(45) Date of Patent: Nov. 16, 2004

(54) SYSTEM AND METHOD FOR PRODUCING WEB-BASED PROCESS ADVISOR APPLICATIONS

(75) Inventors: Christopher Reynolds Hammond, Schenectady, NY (US); Jeffrey Stanley Keller, Cincinnati, OH (US); Austars Raymond Schnore, Jr., Scotia, NY (US)

(73) Assignee: General Electric Company, Schenectady, NY (US)

( * ) Notice: Subject to any disclaimer, the term of this patent is extended or adjusted under 35 U.S.C. 154(b) by 549 days.

(21) Appl. No.: 09/595,865

(22) Filed: Jun. 16, 2000

(51) Int. Cl.[7] ............................................... G06F 15/18
(52) U.S. Cl. .................................................... 706/45
(58) Field of Search ........................... 706/45; 709/217

(56) References Cited

U.S. PATENT DOCUMENTS

| | | | |
|---|---|---|---|
| 5,319,740 A | | 6/1994 | Yamada et al. |
| 5,546,507 A | | 8/1996 | Staub |
| 2001/0020255 A1 | * | 9/2001 | Hofmann et al. ........... 709/318 |
| 2001/0034771 A1 | * | 10/2001 | Hutch et al. ................ 709/217 |
| 2001/0037417 A1 | * | 11/2001 | Meyer ......................... 709/332 |
| 2001/0039540 A1 | * | 11/2001 | Hofmann et al. .............. 707/3 |

FOREIGN PATENT DOCUMENTS

| | | |
|---|---|---|
| EP | 0352514 | 1/1990 |
| EP | 0519096 | 12/1992 |

OTHER PUBLICATIONS

Distributed and Scalable XML Document Processing Architecture for E–Commerce Systems, David Cheung, S.D. Lee, Thomas Lee, William Song, C.J. Tan, 0–7695—610/00, IEEE (2000), pps. 1–6.*

A Query Language for XML (1998), Alin Deutssh, Mary fernandez, Daniela Florescu, Alon Levy, Dan Suciu, Computer Networks (Amsterdam, Netherlands: 1999), pps. 1–19.*

Making legacy data accessible for XML applications (1999), Volker Turau, pps. 1–17.*

Energy & Environmental Information Resources Center (EE–IR Center), e–Newsletter #2, Mar. 1999, pps. 1–4.*

* cited by examiner

*Primary Examiner*—Ramesh Patel
*Assistant Examiner*—Michael B. Holmes
(74) *Attorney, Agent, or Firm*—William Scott Andes; Armstrong Teasdale LLP

(57) ABSTRACT

A system for producing a process advisor application uses a process mapping program, a compiler and a program such as a Java servlet to produce a process advisor application. The process mapping program is used to create a decision tree, and the compiler compiles the decision tree into a data file. The data file is then converted into one or more computer viewable documents, such as web pages.

28 Claims, 3 Drawing Sheets

Figure 4:
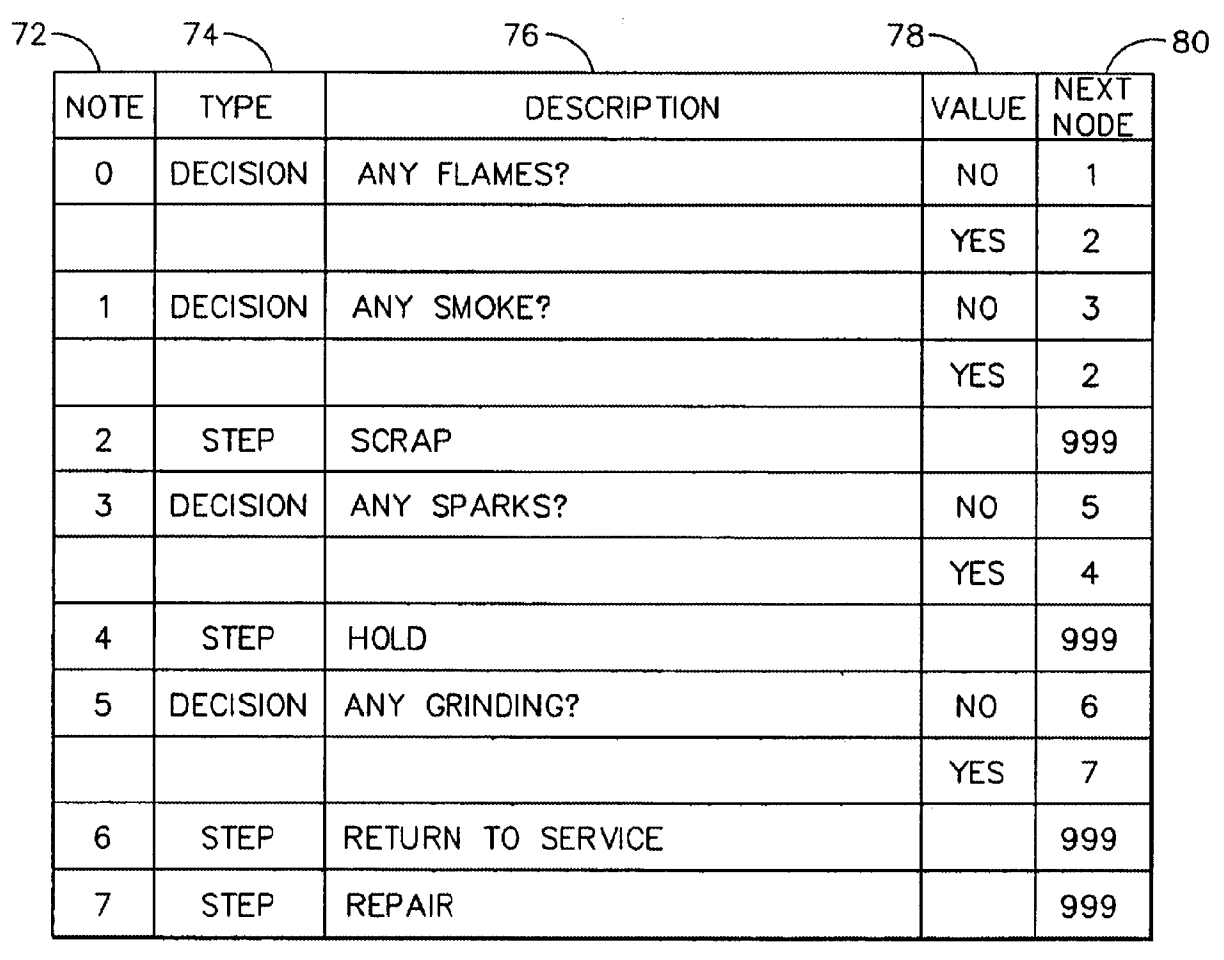

| NOTE | TYPE | DESCRIPTION | VALUE | NEXT NODE |
|---|---|---|---|---|
| 0 | DECISION | ANY FLAMES? | NO | 1 |
|  |  |  | YES | 2 |
| 1 | DECISION | ANY SMOKE? | NO | 3 |
|  |  |  | YES | 2 |
| 2 | STEP | SCRAP |  | 999 |
| 3 | DECISION | ANY SPARKS? | NO | 5 |
|  |  |  | YES | 4 |
| 4 | STEP | HOLD |  | 999 |
| 5 | DECISION | ANY GRINDING? | NO | 6 |
|  |  |  | YES | 7 |
| 6 | STEP | RETURN TO SERVICE |  | 999 |
| 7 | STEP | REPAIR |  | 999 |

SYSTEM AND METHOD FOR PRODUCING WEB-BASED PROCESS ADVISOR APPLICATIONS

BACKGROUND OF THE INVENTION

This invention relates generally to expert systems and more particularly to web-based expert systems that pertain to decision making processes.

In today's global economy, many businesses operate with numerous facilities located around the world. Quite often, similar processes, such as manufacturing and repair processes, are performed at the business's various facilities. Many of these operations are technically complex, decision making processes, and the end result is that process variation can exist between the facilities such that sub-optimal use of available technology occurs.

One approach to combatting such process variation is to employ written communications, such as manuals, and cross-site employee training. However, it is difficult to promptly produces updated manuals and to assure that each facility is using the most recent version. Employee training efforts are time consuming and costly, particularly when dealing with groups of employees located throughout the world. Thus, it has been proposed to use the Internet, and more specifically the World Wide Web, to quickly distribute information on a global basis and reduce or eliminate process variation. Specifically, the knowledge, judgement and experience of one or more experts in a particular process is captured in an expert system application that a business then deploys across its internal and/or external web sites. The expert system application can then be accessed by selected users around the world. Thus, users in any location would be able to easily and quickly obtain standardized process information.

However, web-based expert system applications can be difficult to create and deploy. In many cases, extensive knowledge of the process that the application is to cover as well as programming languages and web authoring is required to create and deploy a web-based expert system. The process knowledge is normally held by persons who have little knowledge of how to distribute their experiential knowledge over the Web. Thus, producing a web-based expert system application usually requires process experts working in collaboration with one or more people having web authoring expertise. This is often a time consuming and expensive effort.

Accordingly, there is a need for a simple tool that would allow knowledge experts to develop web-based applications for distributing their knowledge base.

BRIEF SUMMARY OF THE INVENTION

The above-mentioned need is met by the present invention, which provides a system and method for producing a process advisor application. The system includes a process mapping program for creating a decision tree, a compiler for compiling the decision tree into a data file, and a program for converting the data file into one or more computer viewable documents. The method includes creating a decision tree, compiling the decision tree into a data file, and converting the data file into one or more computer viewable documents.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

FIG. 4 shows an array representation of a decision tree for the sample process of FIG. 3.

DETAILED DESCRIPTION OF THE INVENTION

Figure 1:
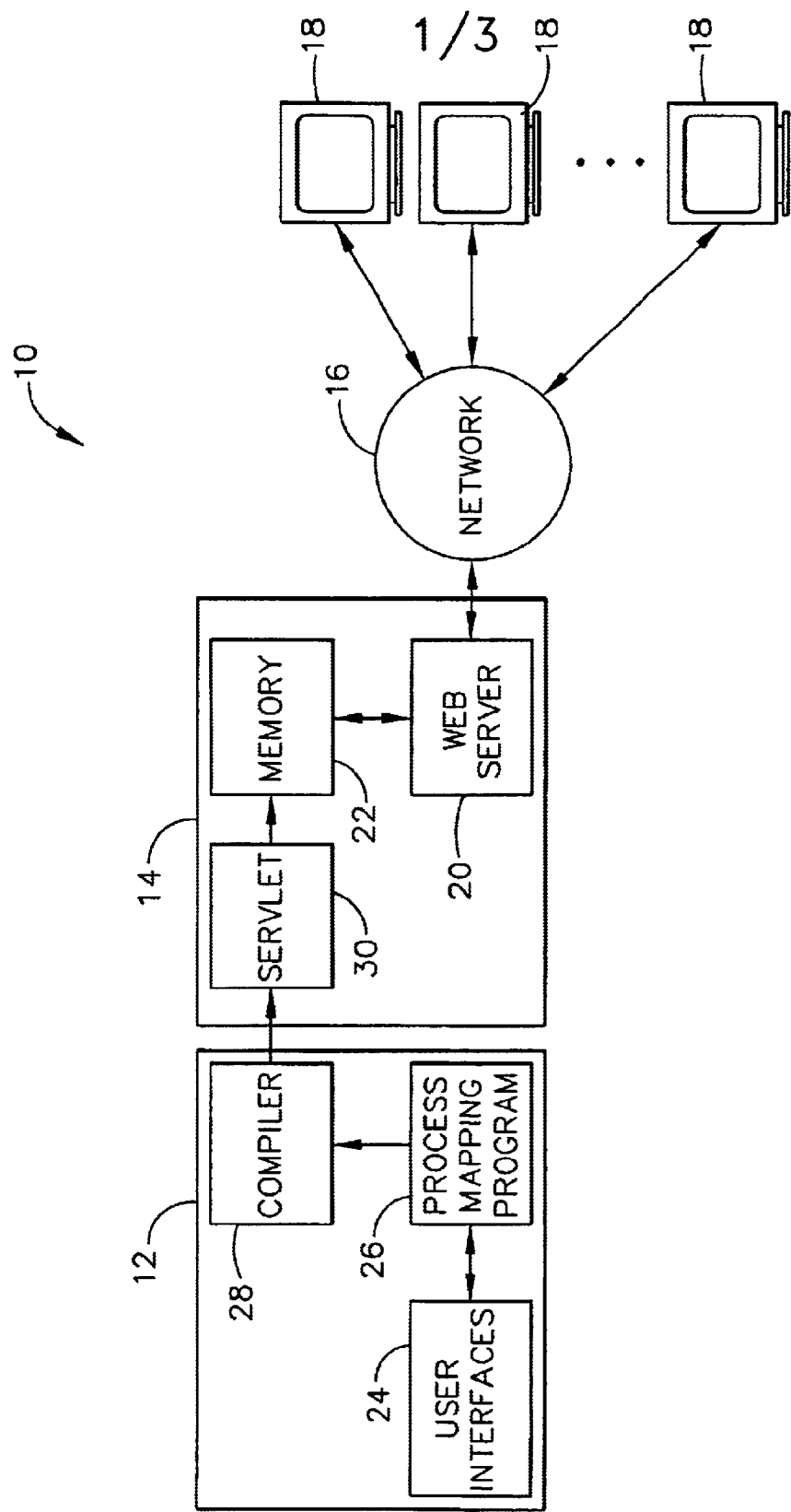
FIG. 1 is a block diagram illustrating one embodiment of the present invention.

Referring to the drawings wherein identical reference numerals denote the same elements throughout the various views, FIG. 1 shows the general architecture of one embodiment of a system 10 for producing (i.e., developing and deploying) process advisor applications and particularly web-based process advisor applications. As used herein, a "processor advisor application" refers to an application that is a specific type of expert system that simulates the knowledge, judgment and experience in a decision making process of one or more persons. As will become apparent, a "web-based process advisor application" is a process advisor application that is capable of being deployed over the World Wide Web.

The system 10 includes a user computer system 12, a server computer system 14, a computer network 16 and one or more client computers 18. The client computers 18 may be any type of computing devices that are capable of transmitting requests for recommended process plans over the network 16 and receiving recommended process plans conveyed over the network 16 in reply to such requests. For example, suitable computing devices include, but are not limited to, desk top computers, laptop computers, and personal digital assistants including wireless handheld computers.

In one preferred embodiment, the network 16 is the World Wide Web, although it possible to employ other types of computer networks such as a local area network or a wide area network. As used herein, the "World Wide Web" (or simply the "Web") refers to the distributed collection of interlinked, computer viewable hypertext documents (commonly referred to as web pages) that are accessible via the Internet. As is known in the art, such hypertext documents are accessed with client and server software using standard Internet protocols such as Transmission Control Protocol/Internet Protocol (TCP/IP) and Hypertext Transport Protocol (HTTP). Currently, HTTP is the primary protocol for allowing applications to locate and acquire web pages, and web pages are notated with Hypertext Markup Language (HTML). However, as used herein, the terms "World Wide Web" and "Web" are intended to encompass not only HTTP and HTML, but also any current or future transport protocols or markup languages that may be used in place of, or in addition to, HTTP and HTML.

The server computer system 14 includes a web server 20 and a memory 22 containing a number of web pages that implement the process advisor application. Each client computer 18 includes a conventional web browser software application that allows the client computers 18 to access the web pages stored in the memory 22 as well as other data stored on any other server systems connected to the network 16. Generally, the web server 20 receives requests to access the web pages from one or more of the client computers 18 and provides the web pages to the requesting client computers 18.

The web pages pertaining to the process advisor application are developed through the user computer system 12, which includes user interfaces 24 such as a keyboard, a mouse and a monitor. The user computer system 12 includes a process mapping program 26 that an operator uses, via the user interfaces 24, to create a process flow diagram or decision tree describing the decision making process for which the process advisor application is to be developed. A compiler 28 converts the decision tree into a file that represents the logic and visual elements of the decision tree that will make up the web-based application. This file is transferred to the server computer system 14 where a servlet program 30 converts the file into web pages with embedded logic, graphics and links.

It should be noted that the user computer system 12 and the server computer system 14 could alternatively comprise a single computer system. That is, the web server 20, the memory 22, the user interfaces 24, the process mapping program 26, the compiler 28 and the servlet program 30 could all be loaded onto one computer system instead of two computer systems.

The process mapping program 26 can be an off-the-shelf software program such as the Visio® 2000 commuter program available from Microsoft Corporation. This program provides a palette that displays a large number of predefined shape icons representing certain decision tree objects and a dynamic grid display onto which an operator may place selected ones of the shape icons. The Visio® 2000 program also allows for the use of customized shape icons. Using the user interfaces 24, an operator selects the appropriate shape icons and drags them to a particular location on the grid display to form the desired decision tree. Shape icons that can be used in the present invention include, but are not limited to:

1. a Start Block that specifies the start point for a decision making process.
2. a Title Block that specifies the title of the web application to appear at the top of a web page.
3. a Header Block that specifies various visual components to appear at the top of a web page such as text fields and pull down menus. HTML template files can also be specified so that each web application has a common look and feel.
4. a Results Block that specifies various visual components to appear at the bottom of a web page such as text fields and pull down menus. Again, HTML template files can also be specified so that each web application has a common look and feel.
5. a Description Block that specifies a textual description of the web application to appear at the top of a web page.
6. Decision Blocks that specify a decision to be made. There can be any number of paths from any decision node.
7. Process Now Blocks that display a process output immediately.
8. Process Later Blocks that display a process output after an operator clicks an appropriate button.
9. Link Now Blocks that jump to a Universal Resource Locator (URL) immediately.
10. Link Later Blocks that jump to a URL after an operator clicks an appropriate button.
11. Annotation Blocks that link a question text to a URL.
12. Text Blocks that specify that a blank text field from the text Block be used as a decision process result.
13. Text Move Connectors that specify that a text field from a text Block be used as a decision process result.
14. Process Flow Connectors that are used to connect Decision, Process, Link and Text Blocks together.

The process mapping program 26 can thus be used to create a decision tree that represents the decision logic for the decision making process for which a process advisor application is to be developed and also includes descriptive text, headers and links applicable to the web pages.

The compiler 28 is a program that traverses the decision tree developed by the process mapping program 26 and stores the information in a hash table. The compiler then reads the hash table and generates an array that represents the logic, header fields, links and descriptive text that make up the decision tree. The array is preferably, although not necessarily, in the form of an Extensible Markup Language (XML) file. However, the present invention is not limited to XML as other languages could be utilized. The servlet program 30 can be a Java servlet that reads the XML file generated by the compiler 28 and produces a set of HTML web pages that are stored in the memory 22 of the server computer system 14. It should be noted that the web pages could alternatively be stored in the memory of another server computer system.

Figure 2:
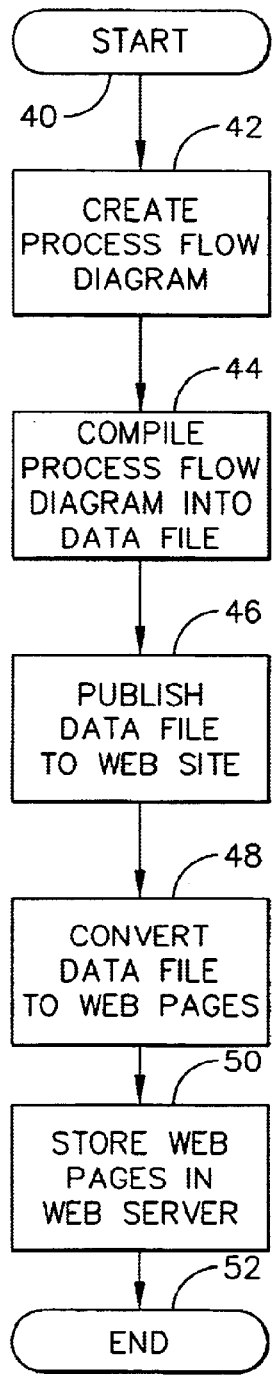
FIG. 2 is a flow chart illustrating a method of developing a process advisor application.

FIG. 2 is a flow chart illustrating a method of developing the web pages pertaining to the process advisor application. The method begins, as represented at block 40, when an operator accesses the user computer system 12. In step 42, the operator uses the user interfaces 24 to access the process mapping program 26 and create a decision tree representing the decision making process for which the process advisor application is to be developed. This is accomplished by dragging appropriate shape icons from the process mapping program's palette to the desired locations on the grid display. The decision tree is then annotated with process and link information. It is contemplated that the operator is someone having a high degree of knowledge regarding the decision making process and its technology. In step 44, the decision tree is compiled by the compiler 28 into a data file that represents the logic and visual elements thereof that will make up the web-based application. The data file is then published to a web site at step 46. As mentioned above, one possible manner of publishing the data file to a web site is to transfer it to the server computer system 14. At step 48, the data file is read in by the servlet program 30 and converted into web pages with embedded logic, graphics and links. The web pages are then stored in the memory 22 of the server computer system 14 at step 50, or, as mentioned above, in the memory of another server computer system. At this point, the process advisor system is ready to be utilized and the method of developing the application is completed, as represented at block 52.

When a remote user wishes to access the process advisor application, he or she utilizes a client computer 18 to access the server computer system 14 (or whatever server computer system on which the web pages pertaining to the process advisor application ultimately reside). Specifically, the client computer's web browser sends a request for a recommend process plan to the web server 20. In response, the web server 20 sends the appropriate web page to the client computer 18. The web page causes an interface screen to be displayed on the client computer's monitor or other output peripheral such as a printer. The interface screen is a graphical user interface that allows the user to enter information relevant to a request for a recommended process plan with input peripherals such as a mouse and/or keyboard. The user is able to both select inputs from a pull-down menu of items contained in the input screen and to input information directly into an input window. The recommended process plan (as determined by the embedded logic of the process advisor application) is subsequently displayed on the interface screen.

Once all of the relevant information has been inputted, the server computer system 14 determines what the recommended process plan should be. The web server 20 then conveys the recommended process plan to the requesting client computer 18 via the network 16.

Figure 3:
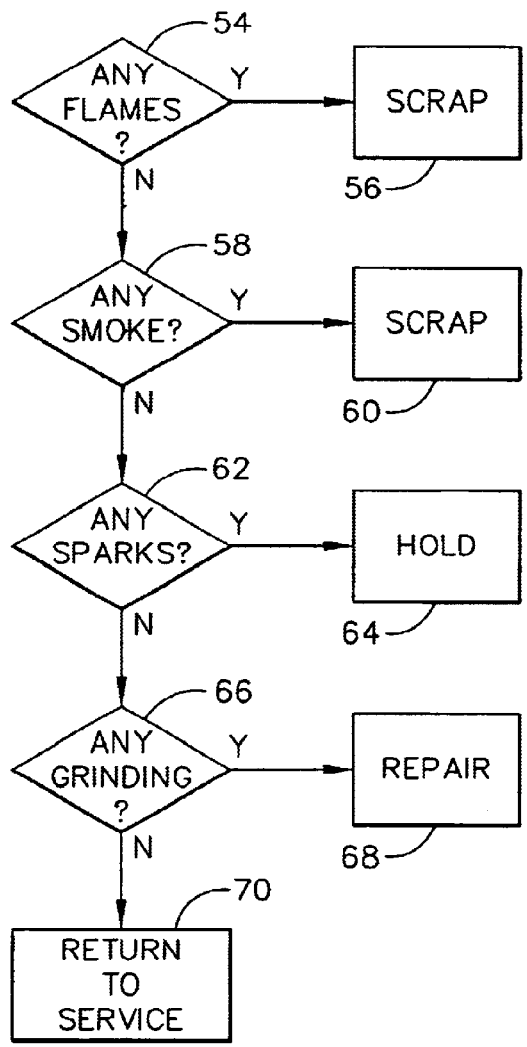
FIG. 3 is a flow chart depicting a sample process for which a process advisor application can be created.

To provide a better understanding of the present invention, the method of producing a process advisor application will now be described as applied to a sample process for inspecting train motors. A typical locomotive engine uses a thermal prime mover to drive a generator. The generator supplies electric current to a plurality of traction motors whose rotors are drivingly coupled to corresponding axle-wheel sets of the locomotive. The motors are periodically inspected for maintenance purposes. FIG. 3 is a flow chart depicting a sample process for inspecting the motors. In the first step, at block 54, the inspector determines whether any flames are present during motor operation. If flame are present, then the motor is scrapped as indicated at block 56 and the process ends. If flames are not present, then the process moves on to block 58. At block 58, the inspector determines whether any smoke is present during motor operation. If smoke is present, then the motor is scrapped as indicated at block 60 and the process ends. If smoke is not present, then the process moves on to block 62 where the inspector looks for the presence of sparks during motor operation. If sparks are present, then the motor is held for further evaluation as indicated at block 64. If sparks are not present, then the process moves on to block 66. Here, the inspector examines the motor for signs are grinding. If grinding is evident, then the motor is sent for repair as noted at block 68. If there is no sign of grinding, then the motor is returned to service as indicated at block 70. This train motor inspection process is a simplified, mock process used here only as an example to illustrate the present invention. It should be understood that the present invention is not limited to use with this process but is instead applicable to a virtually limitless variety of processes.

To produce a process advisor application for the motor inspection process, an operator would utilize the process mapping program 26 of a user computer system 12 to create a decision tree representing the process. The operator would drag a Start Block onto the grid display of the process mapping program 26 to specify the starting point for the process. The operator would then drag a Decision Block onto the grid display to represent the decision node of block 54 from FIG. 3. The operator would enter the text of the question as it is to appear on the process advisor web page; e.g., "Are any flames present?". Decision Blocks would similarly be added for each of the decision nodes of blocks 58, 62 and 66. Text Blocks would be used for each of the operations of blocks 56, 60, 64, 68 and 70. That is, the operator would drag a Text Block to the appropriate location on the display grid and enter the corresponding text (e.g., "Scrap", "Hold", "Repair" or "Return to Service") into the text field.

The decision tree can also be annotated with process and link information to aid users of the process advisor application in answering the questions that will appear on the web page. For example, the question asking whether the motor exhibits grinding could have a hyperlink to a digital image showing what grinding looks like and what are acceptable and unacceptable levels of grinding. Thus, if the user is unsure of how to answer the grinding question, he or she would be able to view the digital image to obtain guidance. To accomplish this, the operator would drag a Link Block to the display grid and identify the URL at which the digital image is viewed. The Decision, Text and Link Blocks are appropriately connected using Process Flow Connectors.

The operator would use a Title Block to specify a title for the process advisor application to appear at the top of the web page and a Description Block to include any desired textual description that would appear on the web page. A Results Block is dragged onto the display grid and connected to the Text Blocks corresponding to blocks 56, 60, 64, 68 and 70 with Text Move Connectors. Thus, depending on how a user answers the questions that will appear on the web page, the appropriate result (i.e., "Scrap", "Hold", "Repair" or "Return to Service") will appear on the web page.

After the operator has completed the decision tree including desired web annotation, the decision tree is compiled by the compiler 28 into a data file that represents the logic and visual elements thereof that will make up the web-based application. As mentioned above, the compiler 28 generates an array that represents the logic, header fields, links and descriptive text that make up the decision tree. FIG. 4 shows an array representation for the motor example decision tree. The array representation includes: (1) a node index column 72; (2) a type column 74 that identifies the type of each node, e.g., step node or decision node; (3) a description column 76 that provides either: (a) a description of the step associated with a step node, or (b) a decision associated with a decision node; (4) a value column 78 that includes a decision value for each decision node; and (5) a next node column 80 that, for each decision node, identifies the next node in the decision tree that is to be traversed depending on which decision value applies.

The servlet program 30 traverses the array representation beginning at node 0 and proceeding through the array until the final node is encountered. In FIG. 4, the final node is identified as node 999. Thus, each node is converted into a line of HTML code. The result is a process advisor application accessible via a client computer 18. In use, a web page interface screen having the four questions that correspond to the decision nodes of blocks 54, 58, 62 and 66 of FIG. 3 is displayed on the client computer. The user answers each question using the hyperlink to digital images if necessary. In response to the users input, the embedded logic of the process advisor application determines the appropriate action to take (scrap, hold, repair or return to service) and displays it in the results portion of the interface screen.

The foregoing has described a system and method that allow knowledge experts to develop web-based applications for distributing their knowledge base. While specific embodiments of the present invention have been described, it will be apparent to those skilled in the art that various modifications thereto can be made without departing from the spirit and scope of the invention as defined in the appended claims.

What is claimed is:

1. A system for producing a process advisor application, said system comprising:

means for creating a decision tree representing a decision making process for which said process advisor application is to be developed;

means for compiling said decision tree into a data file; and means for converting said data file into one or more computer viewable documents.

2. The system of claim 1 wherein said means for creating is an off-the-shelf process mapping program having a palette that displays a large number of predefined shape icons representing certain decision tree objects and a dynamic grid display onto which an operator may place selected ones of the shape icons.

3. The system of claim 1 wherein said means for compiling is a compiler that traverses said decision tree and generates an array that represents said decision tree.

4. The system of claim 3 wherein said array is an XML file.

5. The system of claim 1 wherein said means for converting is a Java servlet.

6. The system of claim 1 further comprising means for storing said computer viewable documents.

7. The system of claim 1 wherein said computer viewable documents are web pages.

8. The system of claim 7 further comprising means for receiving requests to access said web pages via a computer network.

9. The system of claim 8 wherein said computer network is the World Wide Web.

10. The system of claim 7 wherein said means for creating and said means for compiling are loaded on a first computer system and said means for converting are loaded on a second computer system.

11. The system of claim 10 wherein said second computer system includes a web server and a memory for storing said web pages.

12. A system for producing a web-based process advisor application, said system comprising:

a process mapping program for creating a decision tree representing a decision making process for which said process advisor application is to be developed;

a compiler for compiling said decision tree into a data file;

means for converting said data file into one or more web pages; and a memory for storing said web pages.

13. The system of claim 12 wherein said compiler that traverses said decision tree and generates an array that represents said decision tree.

14. The system of claim 13 wherein said array is an XML file.

15. The system of claim 12 wherein said means for converting is a Java servlet.

16. The system of claim 12 further comprising a web server for receiving requests to access said web pages via the World Wide Web.

17. The system of claim 12 wherein said process mapping program and said compiler are loaded on a first computer system and said means for converting and said memory are loaded on a second computer system.

18. The system of claim 17 wherein said second computer system includes a web server for receiving requests to access said web pages via the World Wide Web.

19. A method for producing a process advisor application, said method comprising:

creating a decision tree representing a decision making process for which said process advisor application is to be developed;

compiling said decision tree into a data file; and converting said data file into one or more computer viewable documents.

20. The method of claim 19 wherein creating a decision tree comprises using a off-the-shelf process mapping program having a palette that displays a large number of predefined shape icons representing certain decision tree objects and a dynamic grid display onto which an operator may place selected ones of the shape icons.

21. The method of claim 19 wherein compiling said decision tree into a data file comprises using a compiler to traverses said decision tree and generate an array that represents said decision tree.

22. The method of claim 21 wherein said array is an XML file.

23. The method of claim 19 wherein converting said data file into one or more computer viewable documents comprises using a Java servlet.

24. The method of claim 19 further comprising storing said computer viewable documents in a memory.

25. The method of claim 19 wherein said computer viewable documents are web pages.

26. The method of claim 25 further comprising receiving requests to access said web pages via the World Wide Web.

27. A method for producing a web-based process advisor application, said method comprising:

providing a first computer system having a process mapping program and a compiler;

providing a second computer system having a servlet program and a web server;

using said process mapping program to create a decision tree representing a decision making process for which said process advisor application is to be developed;

using said compiler to compile said decision tree into a data file; and using said servlet program to convert said data file into one or more web pages.

28. The method of claim 27 further comprising storing said web pages in a memory in said second computer system.

* * * * *